United States Patent
Park

(10) Patent No.: US 6,545,774 B1
(45) Date of Patent: *Apr. 8, 2003

(54) METHOD OF CONTROLLING THE MANAGEMENT OF THE ACTIVITY OF FACSIMILE HAVING NO BACK UP BATTERY

(75) Inventor: Byung-oh Park, Kyonggi-do (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,839

(22) Filed: Dec. 29, 1997

(30) Foreign Application Priority Data

Dec. 27, 1996 (KR) .............................. 96-74198

(51) Int. Cl.⁷ ................................. H04N 1/00
(52) U.S. Cl. ....................... 358/441; 358/437; 358/444; 358/404
(58) Field of Search ................................. 358/400, 401, 358/404, 441, 442, 434, 437, 444, 440, 460, 468; 395/113, 115, 116, 112, 181, 182.01, 182.02, 182.12

(56) References Cited

U.S. PATENT DOCUMENTS

| | | | |
|---|---|---|---|
| 4,583,124 A | | 4/1986 | Tsuji et al. |
| 4,878,203 A | * | 10/1989 | Arakawa ................ 365/185.09 |
| 4,975,783 A | * | 12/1990 | Takaoka ...................... 358/404 |
| 5,103,318 A | * | 4/1992 | Takaoaka .................... 358/404 |
| 5,127,013 A | * | 6/1992 | Yoshida ....................... 714/748 |
| 5,280,366 A | * | 1/1994 | Araki .......................... 358/453 |
| 5,307,480 A | * | 4/1994 | Hwang ......................... 714/22 |
| 5,315,397 A | | 5/1994 | Inoue et al. |
| 5,444,767 A | | 8/1995 | Goetcheus et al. |
| 5,537,657 A | | 7/1996 | King, III |
| 5,548,550 A | | 8/1996 | Zanders et al. |
| 5,557,777 A | * | 9/1996 | Culbert .......................... 713/2 |
| 5,590,190 A | * | 12/1996 | Kageyama .................. 379/356 |
| 5,596,710 A | * | 1/1997 | Voigt ..................... 395/182.17 |
| 5,598,548 A | * | 1/1997 | Matsuo et al. .............. 711/103 |
| 5,668,642 A | | 9/1997 | Yoshida |
| 5,758,174 A | * | 5/1998 | Crump et al. .......... 395/750.05 |
| 5,784,174 A | * | 7/1998 | Fujino et al. ............... 358/404 |
| 5,819,013 A | * | 10/1998 | Miyazaki et al. ........... 395/114 |
| 5,822,084 A | * | 10/1998 | Hwang ........................ 358/437 |
| 5,832,331 A | * | 11/1998 | Yoshida et al. ............... 399/43 |
| 5,854,885 A | * | 12/1998 | Abe ............................ 395/113 |
| 5,918,006 A | * | 6/1999 | Saito et al. .................... 714/54 |
| 6,061,148 A | * | 5/2000 | Ishikawa .................... 358/437 |

* cited by examiner

Primary Examiner—Edward Coles
Assistant Examiner—Joseph R. Pokrzywa
(74) Attorney, Agent, or Firm—Robert E. Bushnell, Esq.

(57) ABSTRACT

A method of controlling the management of the activity of facsimile having no backup battery capable of controlling the management of transmitting or receiving activity of facsimile with a nonvolatile RAM (NVRAM) without using a static RAM or a backup battery. During the image data of a document is transmitted or received via facsimile, all the activity items of the facsimile are recorded in the nonvolatile RAM. A power failure is recorded in a result item of the activity items and normal contents are recorded in the other activity items. Whenever the facsimile transmission or reception of the image data in each page is completed, the items of a page and a communication time are corrected and then recorded. After that, when the transmission or reception of the image data of the document is completed, the power failure which is recorded in the result item is corrected to a normal end.

11 Claims, 3 Drawing Sheets

FIG. 3

| MEMORY UNIT (107) | NVRAM (109) |
|---|---|
| - image data<br>- program data and protocol data for controlling the management of the activity of the facsimile | - result<br>- telephone number<br>- transmission/receipt mode time<br>- transmitting/receiving page<br>- communication time |

METHOD OF CONTROLLING THE MANAGEMENT OF THE ACTIVITY OF FACSIMILE HAVING NO BACK UP BATTERY

CLAIM OF PRIORITY

This application makes reference to, incorporates the same herein, and claims all benefits accruing under 35 U.S.C. §119 from an application entitled A Method Of Controlling The Management Of The Activity Of Facsimile Having No Backup Battery earlier filed in the Korean Industrial Property Office on Dec. 27, 1996, and there duly assigned Serial No. 74198/1996 by that Office.

FIELD OF THE INVENTION

The present invention relates to a method of controlling the management of the facsimile activity of in a multifunctional machine, and particularly to a method of controlling the management of the activity of a facsimile having no backup battery capable of controlling the transmitting and receiving facsimile activity with a nonvolatile RAM (NVRAM) without using a static RAM or a backup battery.

DESCRIPTION OF THE RELATED ART

Conventionally, a multifunctional machine is a device which integrates each unit such as a facsimile, a scanner, a printer, a copying machine, etc. in a single body to have multiple functions related to a computer. Accordingly, the multifunctional machine can have new functions which may not be performed if each unit was a stand-alone unit. The multifunctional machine adopts IEEE 1284 as a connection type capable of performing bidirectional communication for interfacing with the computer.

The facsimile system of the multifunctional machine scans the image of the document and transmits the image through a telephone line. After that, the image data received by the telephone line is printed. In addition to the functions of transmitting and receiving the image data and copying the image data of the document, the facsimile system of the multifunctional machine controls the management of the activity of the facsimile using a static random access memory (RAM), a nonvolatile RAM (NVRAM) and a backup battery.

However, the price of the product increases, as the conventional facsimile system uses a static RAM for storing the activity items of the facsimile for controlling the management of the activity of facsimile; the backup battery for preventing the loss of the data stored in the static RAM in the case of power failure; and the nonvolatile RAM (NVRAM) for storing the activity item data of the static RAM supposing that the power failure happens after cancellation of the power failure.

U.S. Pat. No. 5,103,318 for an Image Information Communication Apparatus With Power Interruption Report Generation to Takaoka discloses a facsimile machine that uses non-volatile memory to print out a report upon a power failure. The report in Takaoka includes the date and time, a message representing the time when the power supply is turned off, and file management information related to the files containing image information. I have noticed that the non-volatile random access memory in Takaoka requires a battery backup to achieve this end.

SUMMARY OF THE INVENTION

Therefore, it is an object of the present invention to provide a method of controlling the management of the activity of facsimile transmission/receipt with a nonvolatile RAM (NVRAM) without using a static RAM or a backup battery.

It is another object reduce the production cost and enhance the productivity by removing a backup battery and a static RAM from a facsimile system.

According to the present invention, during when an image data of a document is transmitted or received via facsimile, all the activity items of the facsimile are recorded in a nonvolatile RAM. A power failure is recorded in a result item of the activity items and normal contents are recorded in the other activity items. Whenever either the facsimile transmission or reception of the image data in each page is completed, the items of a page and a communication time are corrected and then recorded. After that, when the transmission or reception of the image data of the document is completed, the power failure which is recorded in the result item is corrected to a normal end.

Moreover, in the case that a power failure happens during the image data of the transmission or reception of the document a record is maintained of the power failure, and the information of the page whose data is transmitted or received prior to the power failure is recorded in the remaining activity items.

The remaining activity items includes a telephone number, a transmission or reception mode, a time, a transmission reception page, a communication time, etc.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 is a table showing what information is stored in the volatile random access memory and what information is stored in the non-volatile random access memory.

DETAILED DESCRIPTION OF THE PREFERRED EMBODIMENTS

Figure 1:
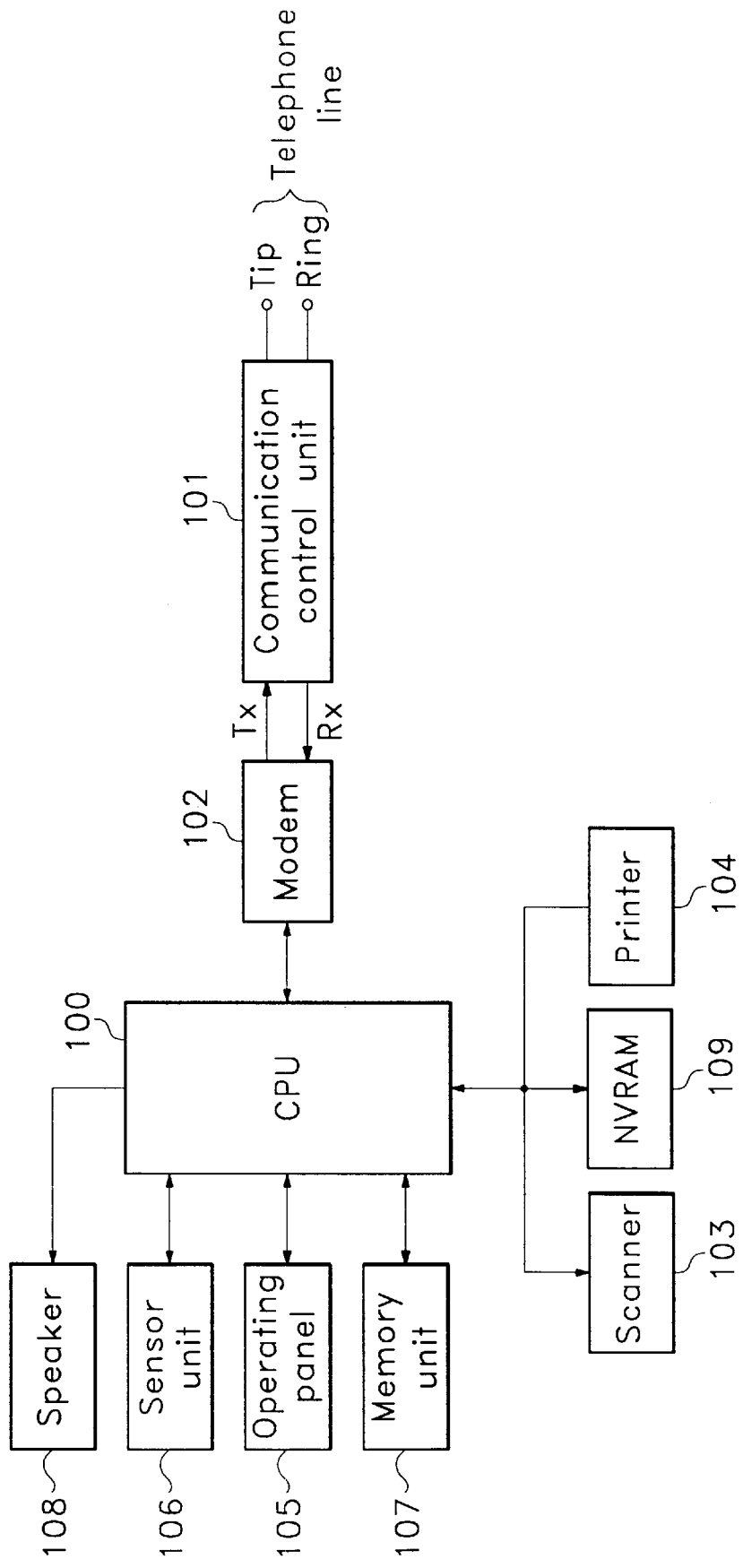
FIG. 1 is a block diagram illustrating an apparatus of controlling the management of the facsimile activity in a multifunctional machine having no backup battery according to the present invention.

FIG. 1 is a block diagram illustrating a facsimile system in a multifunctional machine according to the present invention. As shown in FIG. 1, a central processing unit (CPU) 100 controls the management of the transmitting and receiving activity of the facsimile according to a predetermined program. A memory unit 107 stores program data and protocol data for controlling the management of the activity of the facsimile, and it accesses or stores the data under the control of the CPU 100. An operating panel 105 includes a plurality of keys capable of generating function key data for the system, and a display device for inputting the generated key data to the CPU 100 and displaying display data from the CPU 100. A scanner 103 scans the image of the document and supplies the scanned digital data to the CPU 100, and a printer 104 prints the received data by the control signal of the central processing unit 100. Moreover, a modem 102 outputs the output data of the CPU 100 by converting the output data into an analog signal and modulating an analog signal under the control of the CPU 100 and outputs the received analog signal after A/D conversion and demodulation. On the other hand, a communication control unit 101 operates according to the control of the CPU 100 and forms the communication loop of Tip and Ring telephone lines, so as to interface signals from the modem 102 and the Tip and Ring telephone lines. A sensor unit 106 senses the residual number of the recording pages and supplies it to the CPU 100. A speaker 108 gives an alarm according to the control signal of the CPU 100.

In the case of transmission, a user first inputs a telephone number of another outside facsimile machine through the operating panel 105. After inputting the number, when a start key is pressed, a corresponding command is generated from the CPU 100 and then transmitted to the scanner 103. The scanner 103 which receives the command from the CPU 100 scans the image of the documents to be transmitted and then supplies the image data as binary data to the CPU 100. The CPU stores the image data read by the scanner 103 in the memory unit 107. The image data stored in the memory unit 107 is modulated through the modem 102, and then the data is transmitted to a telephone line path through the communication control unit 101 at a transmitting speed suitable to the state of the Tip and Ring telephone lines. In the case of receiving the data, the data is treated in a reverse process to the transmission process. That is the image data demodulated by the modem 102 is stored in the memory unit 107 by the CPU 100, and then printed by the printer 104, thereby obtaining the original image.

Referring to FIG. 1, the speaker 108 generates an alarm by the control of the CPU 100 when an error occurs during the transmission or reception of data. The sensor unit 106 senses the residual number of the recording papers and informs the CPU 100.

Figure 2:
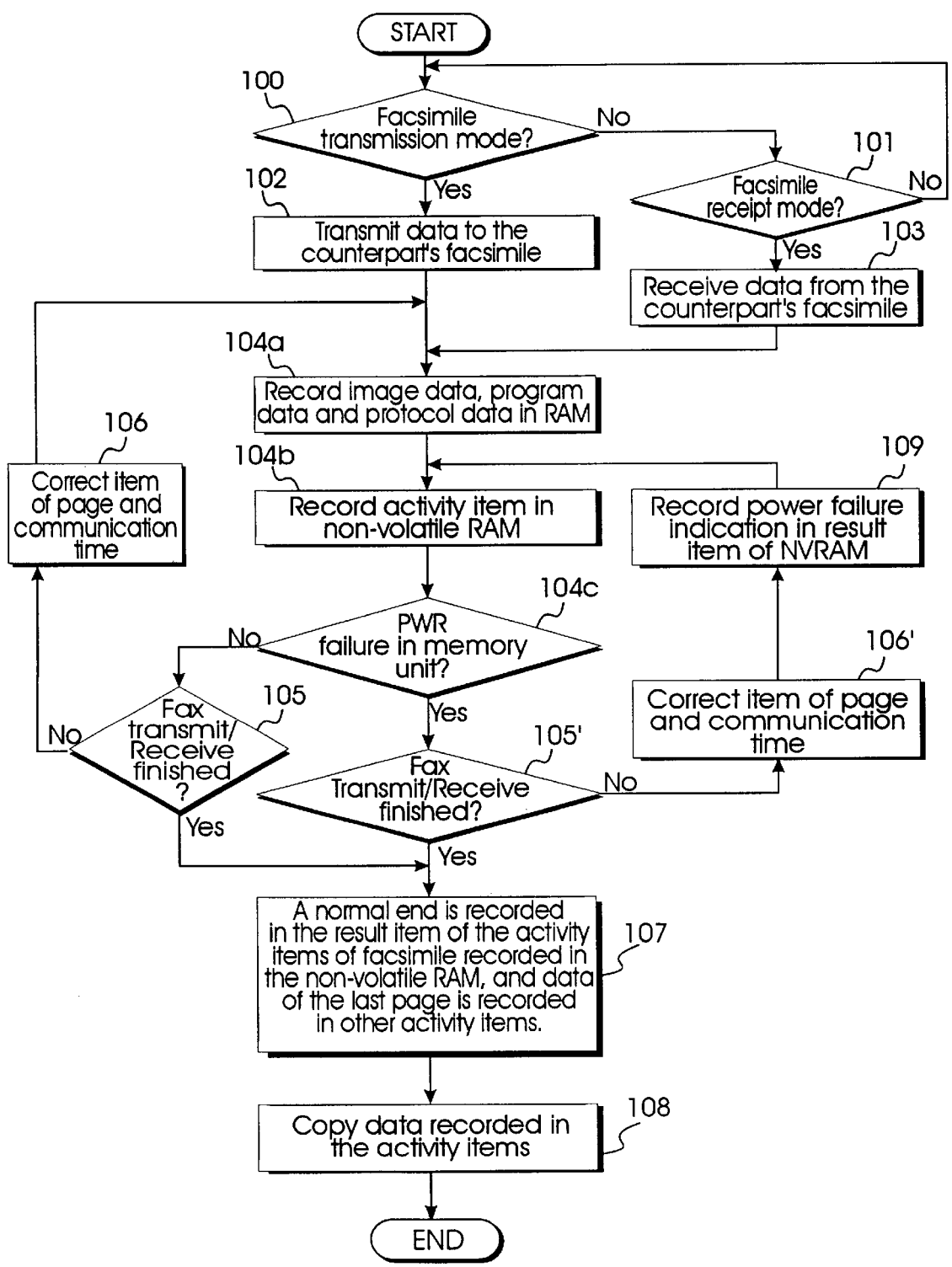
FIG. 2 is a flow chart illustrating the control of the management of the facsimile activity of a facsimile system according to the present invention.

The method for controlling the activity of facsimile in the facsimile system for a communication according to the present invention is illustrated, with reference to FIG. 2. First, in the case that it is determined that the facsimile is in transmission mode (step 100), the CPU 100 scans the image data of the document by the scanner 103 and stores the data in the memory unit 107. In addition, the CPU 100 modulates the data through the modem 102 and transmits the data to the Tip and Ring telephone lines through the communication control unit 101 (step 102).

On the other hand, in the case that it is determined that the facsimile is in reception mode (step 101), the CPU 100 reads the received image data through the modem 102 and stores the data in the memory unit 107, and then prints it using the printer 104 (step 103).

CPU 100 records image data, program data and protocol data in RAM (step 104*a*). Meanwhile early in the transmission mode or in the reception mode the CPU 100 records all the activity items of the facsimile such as the telephone number, result, whether the facsimile is in transmission or reception mode, time, transmitting or receiving page, communication time, etc. in the nonvolatile RAM 109 (step 104*b*). It is now determined if there is a power failure in a memory unit (step 104*c*). Here, in the result item of the activity items, POWER FAILURE is recorded, supposing that the power failure happens. In the remaining activity items, the present states are normally recorded. FIG. 3 discloses which data is stored in memory unit 107 and which data is stored in non-volatile random access memory 109. After that, it is determined whether the facsimile transmission or reception is completed (step 105, 105'). In the case that the transmission or reception is not completed, the item data of the page and the communication time are updated to the data of the last page whose transmission or reception is recently completed (step 106,106'). In other words, the data of a previous page whose transmission or reception is completed are recorded in the activity items supposing that the power failure happens during transmitting or reception at a predetermined page. As a result, whenever the facsimile transmission or reception of each page is completed, the data of items, the page and the communication time of the previous page are updated to the data of a page whose transmission or reception is completed. Accordingly, in this situation even though the transmission or reception of the data of each page is completed, the POWER FAILURE which is recorded in the result item of the nonvolatile RAM when transmitting or receiving the data is still maintained.

When the facsimile transmission or reception is completed, the CPU 100 updates all the activity items including the result item of the nonvolatile RAM 109 (step 107). That is, the POWER FAILURE which is recorded in the result item when transmitting or receiving the data via facsimile is substituted with a NORMAL END, etc. Moreover, data of the other activity items are corrected to the data of the last page. As an example of the result of the transmission or reception, the NORMAL END is displayed. However, a MEMORY FULL or a COM ERROR can occur.

After that, when the printing operation is selected to see the data of the activity items of the facsimile stored in the nonvolatile RAM 109, the CPU 100 reads the data finally recorded in the activity items of the nonvolatile RAM 109 and then copies the data to the printer 104 or displays the data on the display device of the operating panel 105 (step 108).

As described above, when the image data of the document or documents is transmitted or received via facsimile, all the activity items of the facsimile are recorded in a nonvolatile RAM. The power failure is recorded in the result item of the activity items, supposing that a power failure happens, and normal contents are recorded in the other activity items. Whenever the facsimile transmission or reception of the image data in each page is completed, the other items of a page and a communication time are corrected to the data of the last page whose transmission or reception is recently completed. After that, when the transmission or reception of the image data of the document is completed, the power failure which is recorded in the result item is corrected to a normal end. As a result, it is possible to control the management of the activity of facsimile without using static RAM having a backup battery when the power is turned off.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of controlling a management of activity of a facsimile machine, comprising the steps of:

selectively transmitting and receiving image data for a communication by a facsimile machine, wherein when a power failure occurs during the selective transmission and reception of image data the occurrence of said power failure is recorded in a non-volatile memory;

recording image data for said communication in a random access memory of said facsimile machine;

recording activity data for a last completed page that has been one of selectively transmitted and received for said communication in said non-volatile memory of said facsimile machine, said non-volatile memory having no battery backup;

recording an indication of any said power failure in said non-volatile memory of said facsimile machine when a power failure to said random access memory occurs and recording activity data for said selective transmission and reception of image data in said non-volatile memory when a power failure to said random access memory does not occur;

determining whether said communication has been completed; and when said power failure occurs and said indication of said power failure is recorded in said non-volatile memory and then the communication is resumed to complete the communication normally, correcting said activity data during one of selective transmission and reception of said communication to correspond to a normal communication end for said last completed page for said communication.

2. The method of claim 1, further comprising the step of printing out said activity data for said communication from said non-volatile memory.

3. The method of claim 2, further comprised of said activity data including a result of one of said selective transmission and reception of said image data for said communication, a telephone number for said communication, whether said facsimile machine is one of transmitting and receiving said image data for said communication, a time corresponding to said communication, a page number for said last completed page of said communication, and a communication time for said last completed page of said communication.

4. A facsimile apparatus, comprising:

communication means, coupled to a transmission line, for exchanging image information with said transmission line for a communication;

a random access memory for storing image data and program data and protocol data controlling a management of activity of said facsimile apparatus for said communication;

a non-volatile random access memory for storing activity data for a last completed page for which said image information has been exchanged with said transmission line for said communication, said non-volatile random access memory storing data in the absence of a backup voltage being supplied to said non-volatile random access memory; and printing means, coupled to said non-volatile random access memory, for printing said activity data corresponding to said communication, said non-volatile memory storing an indication of a power failure when said random access memory fails to receive power, said non-volatile memory substituting an indication of a normal communication end for said indication of said power failure when said communication is resumed and completed normally after said power failure.

5. The facsimile apparatus of claim 4, further comprised of said activity data including a result of one of a selective data transmission and reception of image data for said communication, a telephone number for said communication, whether said facsimile apparatus is one of transmitting and receiving said image data for said communication, a time corresponding to said communication, a page number for said last completed page of said communication, and a communication time for said last completed page of said communication.

6. The facsimile apparatus of claim 5, further comprised of said result of one of said selective data transmission and reception includes an indication of any power failure to said random access memory.

7. The facsimile apparatus of claim 6, further comprising a scanner to read said image data for said communication during a facsimile transmission.

8. A method of controlling a management of activity of a facsimile apparatus having no backup battery, comprising the steps of:

recording activity items, said activity items including at least one of a telephone number, result item data, a transmission mode, a reception mode, a transmitting page number, a receiving page number, and a communication time, for a facsimile communication that has been one of selectively transmitted and received by said facsimile apparatus in a non-volatile random access memory of said facsimile apparatus, said non-volatile random access memory having no battery backup, when one of selective transmission and reception of said facsimile communication is performed by said facsimile apparatus;

recording, when occurring, an indication of a power failure in a result item in said non-volatile random access memory of said facsimile apparatus;

correcting and recording said activity items to correspond to a last completed page of said facsimile communication and a communication time corresponding to said last completed page of said facsimile communication whenever one of selective transmission and reception of image data of each page of said facsimile communication is completed; and correcting any said indication of any said power failure recorded in said result item to a normal end and then recording when one of selective transmission and reception of said facsimile communication is normally completed.

9. The method of claim 8, further comprised of any said indication of any said power failure being stored in said result item and information corresponding to said last completed page of said facsimile communication prior to any said power failure being stored in other of said activity items, in a case that any said power failure occurs during one of selective transmission and reception of image data of said facsimile communication.

10. The method of claim 9, further comprising a step of correcting said indication of any said power failure recorded in said result item as an error occurrence, when one of selective transmission and reception of image data for said facsimile communication is completed with an error occurring.

11. The method of claim 10, further comprised of said other of said activity items including a telephone number for said facsimile communication, one of a transmission mode and a reception mode for said facsimile communication, a time corresponding to said facsimile communication, a page number for said last completed page of said facsimile communication, and said communication time corresponding to said last completed page of said facsimile communication.

* * * * *